United States Patent [19]

Aykut et al.

[11] Patent Number: 4,518,075
[45] Date of Patent: May 21, 1985

[54] APPARATUS FOR GATHERING AND SINGULARIZING STACKS OF PAPER SHEETS OR THE LIKE

[75] Inventors: Kurt Aykut; Klaus Reissmann, both of Hamburg, Fed. Rep. of Germany

[73] Assignee: E.C.H. Will (GmbH & Co.), Hamburg, Fed. Rep. of Germany

[21] Appl. No.: 374,939

[22] Filed: May 5, 1982

[30] Foreign Application Priority Data

May 8, 1981 [DE] Fed. Rep. of Germany ....... 3118169

[51] Int. Cl.³ ............................................. B65G 47/31
[52] U.S. Cl. ..................................... 198/460; 198/461
[58] Field of Search ................ 198/425, 460, 461, 462

[56] References Cited

U.S. PATENT DOCUMENTS

| 3,187,878 | 6/1965 | Harrison et al. | 198/461 |
| 3,695,411 | 10/1972 | Tobey et al. | 198/461 |
| 3,794,154 | 2/1974 | Holt | 198/461 |
| 3,976,499 | 8/1976 | Tilby | 198/461 |
| 4,190,146 | 2/1980 | Knuchel | 198/460 |
| 4,230,218 | 10/1980 | Knuzmann | 198/461 |
| 4,281,756 | 8/1981 | Bruno | 198/460 |
| 4,341,334 | 7/1982 | Bier | 198/425 |
| 4,360,098 | 11/1982 | Nordstrom | 198/425 |
| 4,366,895 | 1/1983 | Bennett et al. | 198/425 |

FOREIGN PATENT DOCUMENTS

| 1049284 | 1/1959 | Fed. Rep. of Germany | 198/425 |
| 7705913 | 12/1978 | Netherlands | 198/461 |

Primary Examiner—Joseph E. Valenza
Assistant Examiner—Daniel R. Alexander
Attorney, Agent, or Firm—Peter K. Kontler

[57] ABSTRACT

Apparatus for converting successive groups of neighboring stacks of paper sheets into a row of spaced-apart equidistant stacks has a first transporting unit which receives at intervals groups of stacks from a maker and advances successive groups at intervals lengthwise so that the neighboring groups are separated by gaps. The first transporting unit is followed by a second transporting unit having a series of gathering conveyors which are driven at a relatively low constant speed and some of which can be driven at intervals at a higher second speed to thus cooperate with the first transporting unit, whose speed can be varied between zero speed and the second speed, in order to eliminate gaps between successive groups and to form a composite group of immediately adjacent stacks. Such composite group is broken down into a row of spaced-apart equidistant stacks by several singularizing conveyors of a third transporting unit which receives successive stacks from the foremost gathering conveyor of the second unit and successive conveyors of which are driven at higher speeds to increase the clearances between successive stacks of the row to a desired value in stepwise fashion.

21 Claims, 10 Drawing Figures

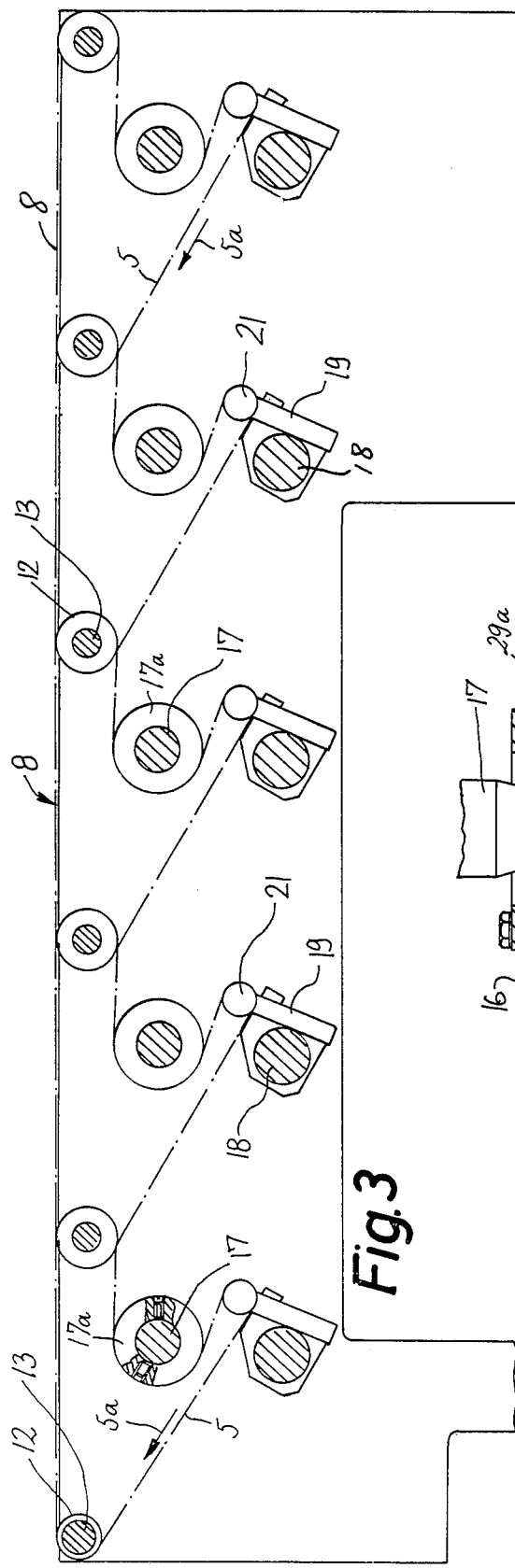
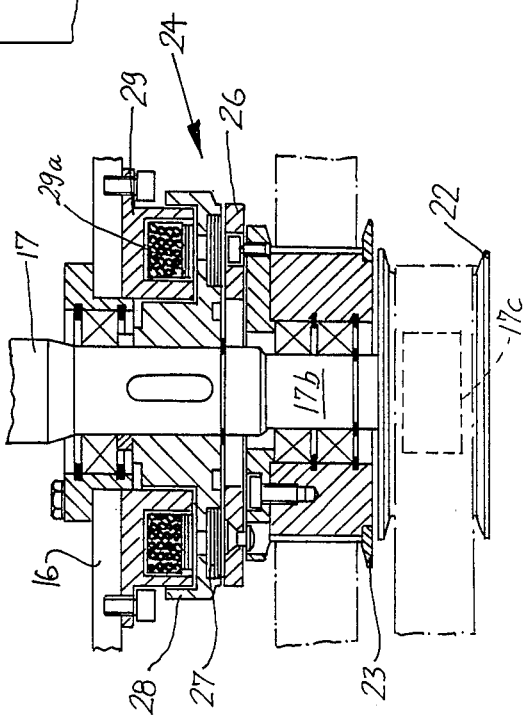
Fig.3
Fig.5

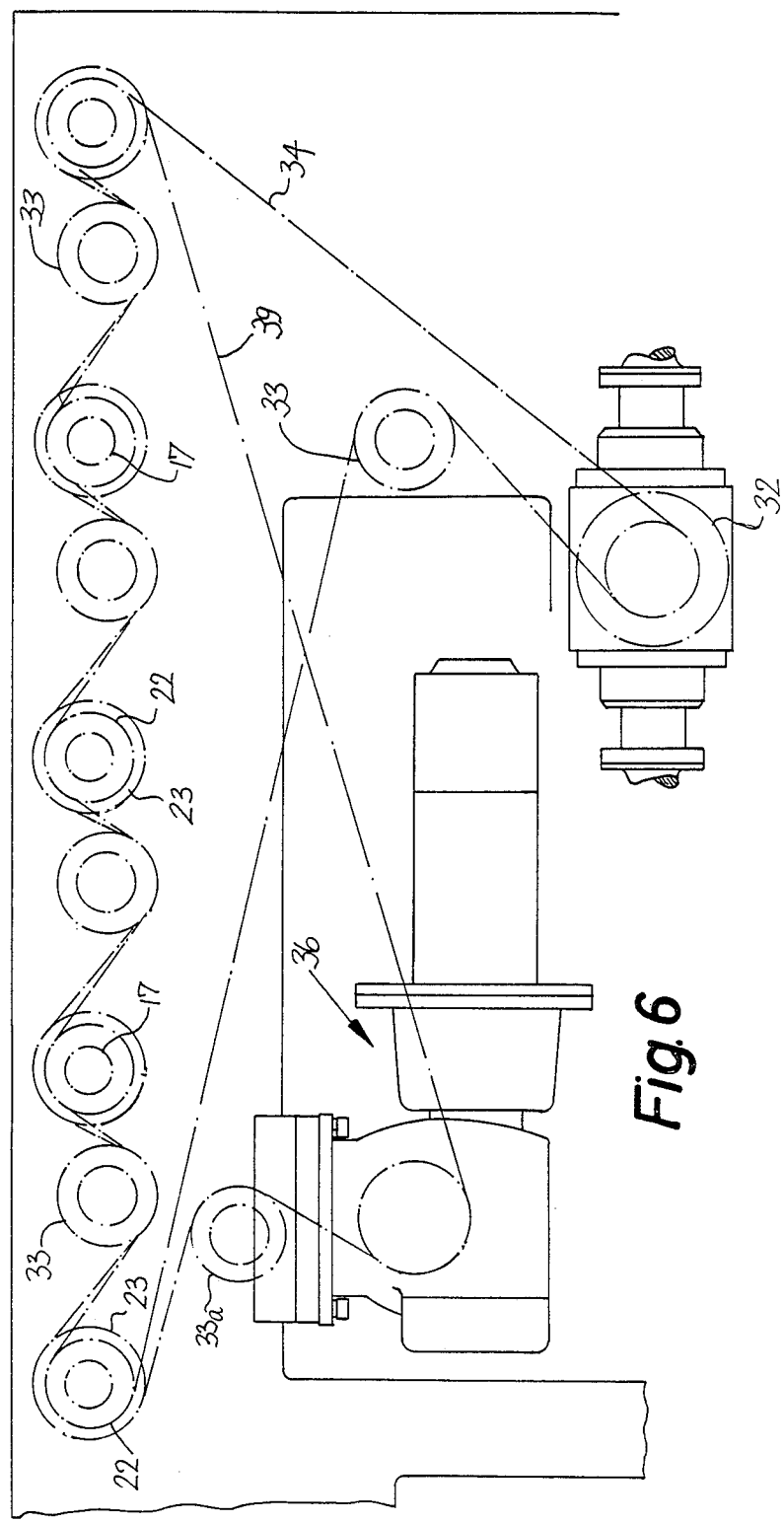

APPARATUS FOR GATHERING AND SINGULARIZING STACKS OF PAPER SHEETS OR THE LIKE

BACKGROUND OF THE INVENTION

The present invention relates to apparatus for manipulating discrete commodities, especially to improvements in apparatus for manipulating groups of identical or similar commodities, such as groups of stacked sheets, plates, boards, foils or the like. More particularly, the invention relates to improvements in apparatus which serve to singularize groups of discontinuously supplied commodities (hereinafter referred to for convenience as stacks of paper sheets with the understanding, however, that the apparatus can treat other types of commodities with equal or similar facility), especially to singularize commodities which are supplied in groups forming files of closely or immediately adjacent commodities and being delivered to the singularizing location in a direction at right angles to the longitudinal direction of such files.

It is already known to singularize groups of neighboring stacks of paper sheets or the like by delivering such groups to a first conveyor which can be driven discontinuously at different speeds to advance successive groups into the range of a continuously driven accumulating or gathering conveyor. The latter is located ahead of a singularizing conveyor whose speed exceeds the speed of the gathering conveyor. Apparatus of such type are employed in or in conjunction with multi-track machines which turn out groups of neighboring stacks and whose output must be processed subsequent to completion of the singularizing step, e.g., for the purpose of inserting or otherwise introducing successive stacks into discrete cartons or other types of receptacles. The aforementioned multi-track machines may constitute or form part of production lines wherein large sheets of paper or the like are severed lengthwise and crosswise to yield smaller sheets which are accumulated into groups of stacks of superimposed smaller sheets. Each stack can constitute a ream or it may contain a different (larger or smaller) number of superimposed sheets. In such machines, several stacks of sheets (i.e., the aforementioned groups of e.g., five or seven neighboring stacks) are turned out at regular intervals, and successive groups must be converted into successive sections of a single row wherein the stacks are equally spaced apart from one another to allow for insertion of successive stacks into successive receptacles at regular intervals. A packing machine for stacks of superimposed sheets is disclosed, for example, in commonly owned U.S. Pat. No. 4,237,674 granted Dec. 9, 1980 to Kurt Aykut. The disclosure of this patent is incorporated herein by reference.

As a rule, successive groups of immediately or closely adjacent stacks are converted into a composite group wherein the stacks are immediately adjacent to each other, and such composite group is then converted into the aforementioned row of spaced-apart stacks which advance toward a packing or another consuming machine. For example, a tongs or another suitable gripper can be used to deliver successive groups of, for example, five neighboring stacks onto the aforementioned first conveyor of a conventional apparatus, and the first conveyor delivers successive groups onto the continuously driven gathering conveyor in order to convert successive groups into a single file of immediately adjacent (i.e., abutting) stacks. The tongs deliver successive groups at right angles to the longitudinal directions of such groups, and the first conveyor advances successive groups lengthwise, i.e., so that each group has a leader constituting one of the outermost stacks therein and a trailing portion constituting the other outermost stack. Such transport of successive groups from the first onto the gathering conveyor should result in elimination of gaps which necessarily develop between successive groups of stacks as a result of discontinuous or intermittent delivery of groups onto the first conveyor and intermittent operation of the first conveyor. In other words, the foremost stack of a next-following group must catch up with the rearmost stack of the preceding group not later than at the instant when the transfer of the next-following group from the first conveyor onto the gathering conveyor is completed. This is necessary because the formation of the aforementioned single row of spaced-apart equidistant stacks is facilitated (or is possible only) if the stacks of the group which is singularized as a result of transfer of its components from the gathering onto the singularizing conveyor are immediately adjacent to each other, i.e., if the neighboring stacks of the composite group (or at least of the front portion of the composite group) of stacks on the gathering conveyor are in actual abutment with one another.

The carrying out of the just discussed steps or operations in conventional gathering or accumulating and singularizing apparatus involves the utilization of complex, bulky and expensive controls and other instrumentalities, especially if such apparatus are used in or in conjunction with modern high-speed stack forming or producing machines which can turn out groups of several stacks each at a high frequency. A serious drawback of heretofore known gathering and singularizing apparatus is that they are likely to cause deformation or collapse of stacks and/or to damage certain sheets (especially the lowermost sheets) of the stacks, particularly when the apparatus of heretofore known design are used in or with high-speed stack forming and delivering machines. Shifting of sheets in certain stacks or in all of the stacks is particularly likely during abrupt acceleration or deceleration of stacks, e.g., during transfer of stacks from the first onto the gathering conveyor and/or from the gathering onto the singularizing conveyor of a conventional apparatus. Furthermore, heretofore known apparatus are incapable of transporting stacks or groups of stacks through greater distances such as would considerably exceed the length of a conveyor (i.e., which would necessitate pronounced and extended shifting of stacks relative to the conveyor means therebelow) because this would invariably entail smudging, crushing, creasing, curling and/or other damage to certain sheets, especially to the lowermost sheets of the stacks.

OBJECTS AND SUMMARY OF THE INVENTION

An object of the invention is to provide a novel and improved apparatus which can convert a succession of discrete groups of neighboring commodities, especially stacks of paper sheets or the like, into a single row wherein the commodities are spaced apart and equidistant from each other, and which can carry out such conversion at a speed and with a degree of reproducibility which cannot be matched by heretofore known apparatus.

Another object of the invention is to provide an apparatus which is less likely to deform, collapse and/or otherwise adversely affect the stacks and/or the constituents of stacks than heretofore known gathering and singularizing apparatus.

A further object of the invention is to provide an apparatus which can accept and process the output of modern high-speed stack forming and delivering machines, and which can convert successive groups of stacks into a single row of stacks wherein the spacing between neighboring stacks can be selected and varied within a wide range to synchronize the operation of such apparatus with that of one or more processing machines, e.g., one or more packing machines for reams of paper sheets or the like.

An additional object of the invention is to provide an apparatus of the above outlined character which is less likely to deface, deform and/or otherwise damage the lowermost sheet or sheets of stacks of paper sheets or the like than heretofore known apparatus, and which can ensure gentle treatment of stacks and their components at elevated, average or low speeds.

Still another object of the invention is to provide an apparatus whose operation can be partially or fully automated but which nevertheless affords access to all of the stacks and/or permits visual inspection of each stage or phase of conversion of successive groups of stacks into a single row or into several rows of spaced-apart equidistant stacks.

Another object of the invention is to provide a novel and improved method of converting successive groups of neighboring stacks into a single row or into several rows of spaced-apart equidistant stacks.

A further object of the invention is to provide the apparatus with novel and improved means for accepting successive groups of stacks which are supplied by a stack forming or delivering machine, e.g., a multi-track machine which converts large sheets into smaller sheets and assembles the smaller sheets into groups of several (e.g., five or seven) closely adjacent stacks.

Another object of the invention is to provide the apparatus with novel and improved means for converting successive discrete groups of neighboring stacks into a single group or file wherein the neighboring stacks are immediately or closely adjacent to each other.

An additional object of the invention is to provide the apparatus with novel and improved means for controlling or regulating the speed of its components in order to ensure gentle treatment of stacks during conversion of successive groups of stacks into a single row or into several rows of spaced-apart equidistant stacks.

Still another object of the invention is to provide the apparatus with novel and improved means for ensuring uniform distribution of arriving stacks to several processing or consuming machines even if the apparatus receives groups containing odd numbers of stacks.

A further object of the invention is to provide the apparatus with novel and improved means which enables it to alternately feed equidistant stacks to one or more processing or consuming machines, e.g., to continue to meet the requirements of one packing machine when the other packing machine is arrested or operates at less than normal speed.

An ancillary object of the invention is to provide an apparatus which can be readily installed in existing production lines for paper sheets or the like as a superior substitute for heretofore known apparatus.

An additional object of the invention is to provide an apparatus which is especially useful in or in combination with modern high-speed machines for the making and assembling of paper stacks or the like because it can adequately process the output of such machines without constituting a bottleneck in the production line, e.g., in a production line wherein large sheets of paper or the like are processed and packed so that the ultimate products are receptacles containing reams or other numbers of accurately stacked and properly packed smaller sheets.

A further object of the invention is to provide an apparatus which, in spite of its versatility, is not bulkier than heretofore known apparatus, which requires a minimum of attention, and which can be readily designed to process smaller or larger groups of stacks as well as stacks which consist of small, medium-sized or large sheets or similar constituents.

The invention is embodied in an apparatus for manipulating groups of discrete commodities, particularly for singularizing groups of stacks of paper sheets or the like. The apparatus comprises a first transporting unit which serves to receive a succession of groups consisting of at least substantially aligned neighboring commodities and to discontinuously advance such groups at a variable speed in a predetermined direction along a first portion of a preferably horizontal path so that successive groups leaving the first transporting unit are separated from each other by clearances or gaps whose width may but need not be constant, and a second transporting unit which comprises a series of gathering conveyors defining a second portion of the path downstream of the first portion, as considered in the direction of transport of groups along the first portion of the path, to thereby advance successive groups arriving from the first transporting unit in the aforementioned direction. The second transporting unit further comprises first drive means for driving the gathering conveyors at a first speed in order to advance successive groups arriving from the first transporting unit in the aforementioned direction, and second drive means for intermittently driving at least one of the gathering conveyors at a higher second speed so as to eliminate the gaps between successive groups which are supplied by the first transporting unit and to thus form a composite group of neighboring commodities. Still further, the apparatus comprises a third transporting unit including singularizing conveyor means defining a third portion of the path downstream of the second portion and being operative to convert the composite group into a row of spaced-apart and at least substantially equidistant commodities which are ready to be advanced to a further processing station (e.g., to a packing machine), to storage or to another destination.

The first speed is preferably a constant speed. The first transporting unit comprises conveyor means (e.g., one or more endless belt conveyors) for successive groups of commodities and means for intermittently driving such conveyor means at speeds varying between zero speed and a speed exceeding the first speed, preferably a speed matching the second speed. The third transporting unit preferably comprises means for driving the singularizing conveyor means at a speed exceeding the first speed. Still further, the apparatus preferably comprises tongs or other suitable means for delivering to the first transporting unit groups in the form of aligned and closely adjacent (e.g., abutting) commodities which are disposed one behind the other, as considered in the aforementioned direction, so that each of the thus delivered groups can be said to constitute a file of neighboring commodities.

The second transporting unit further comprises means for regulating the operation of the second drive means so as to accelerate at least one but preferably several gathering conveyors (e.g., the first n−1 gathering conveyors, wherein n is the total number of gathering conveyors) to the second speed in a predetermined sequence, preferably one after the other, as considered in the aforementioned direction (namely, starting with the gathering conveyor which is nearest to the first transporting unit and proceeding with successive gathering conveyors up to but not including the gathering conveyor which is nearest to the third transporting unit). The regulating means preferably comprises one or more photocells or other suitable means for monitoring the second portion of the path. The monitoring means effects acceleration of successive gathering conveyors to the second speed on movement of discrete groups of commodities beyond such gathering conveyors. For example, the monitoring means can comprise a succession of photocells which generate signals on movement of trailing ends of successive groups therebeyond, and such signals are used to accelerate the corresponding gathering conveyors or the preceding gathering conveyors from the first to the second speed so that the next-following group is moved nearer to the preceding group and the two groups are ultimately merged into the aforementioned composite group whose leader is broken up into discrete spaced-apart commodities and whose trailing end is replenished by the addition of successive discrete groups of commodities.

In accordance with a presently preferred embodiment of the invention, each gathering conveyor can comprise a shaft and the first drive means comprises a motor, an endless toothed belt and discrete driver wheels on the shafts or analogous means for transmitting torque from the motor to the shafts, and overrunning clutches (e.g., commercially available freewheels) which are interposed between the torque transmitting means and the shafts to allow the shafts to rotate at a speed exceeding the first speed while the motor continues to run. In other words, such design of the first drive means ensures that the shafts are always driven, at least at the first speed, and that each shaft can be accelerated from the first speed to the second speed (which is greater than the first speed) in response to activation or connection of the second drive means. The second drive means can comprise a second motor, means for transmitting torque from the second motor to the shaft of at least one of the gathering conveyors, and clutch means which is interposed between the shaft of the one gathering conveyor and the just mentioned torque transmitting means and is energizable to accelerate the shaft of the one gathering conveyor to the second speed. The torque transmitting means between the second motor and the shaft of the one gathering conveyor can comprise an endless toothed belt and a driver wheel which is rotated by the toothed belt and can transmit torque to the shaft of the one gathering conveyor in response to energization of the clutch. The means for engaging the clutch can include the aforementioned means for monitoring the second portion of the path.

The means for delivering discrete groups of commodities to the first transporting unit can comprise or form part of a machine having a prime mover which transmits motion to the motor of the first drive means. For example, the prime mover may constitute a variable-speed electric motor, and the motor of the first drive means can constitute a transmission whose input element receives torque from the prime mover.

The second drive means of the second transporting unit can derive motion from the means for driving the first transporting unit. For example, the first transporting unit can comprise one or more endless belt conveyors which are intermittently driven (between zero speed and the second speed) by a motor which constitutes the aforementioned motor of the second drive means.

The singularizing conveyor means can comprise a series of discrete singularizing conveyors which are disposed one after the other as considered in the direction of transport of groups by the first and second transporting units, and means for driving successive singularizing conveyors at progressively higher speeds so that the commodities which are delivered onto the third transporting unit are accelerated in stepwise fashion and the distance between successive discrete commodities of the row of spaced-apart commodities grows stepwise to the desired final value. The discrete singularizing conveyors can constitute endless belt conveyors.

In accordance with a modification, the first transporting unit can comprise two discrete conveyors (e.g., two endless belt conveyors having coplanar upper reaches which define the first portion of the path), and drive means for selectively moving each of these conveyors in and counter to the aforementioned direction. The modified first transporting unit can further comprise means for varying the effective length of the discrete conveyors in such a way that the effective length of one of the discrete conveyors increases simultaneously with a corresponding reduction of effective length of the other discrete conveyor or vice versa. The means for varying the effective length of the two discrete conveyors is preferably designed to vary the length of the aforementioned upper reaches of such conveyors, e.g., by the width of a commodity (as considered in the aforementioned direction). For example, the two discrete conveyors of the first transporting unit can have pulleys which are adjacent to each other and are mounted on a carriage constituting the aforementioned length varying means and being movable back and forth in and counter to the aforementioned direction.

The gathering conveyors may be interdigitated with each other, and each gathering conveyor can comprise one or more endless belts or chains.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an enlarged fragmentary longitudinal vertical sectional view of a portion of the improved apparatus, showing five of the gathering conveyors in the second transporting unit;

FIG. 5 is an enlarged horizontal sectional view of a detail in the structure shown in FIG. 4;

FIG. 6 is an enlarged schematic front elevational view of a portion of the second transporting unit;

DESCRIPTION OF THE PREFERRED EMBODIMENTS

Figure 1:
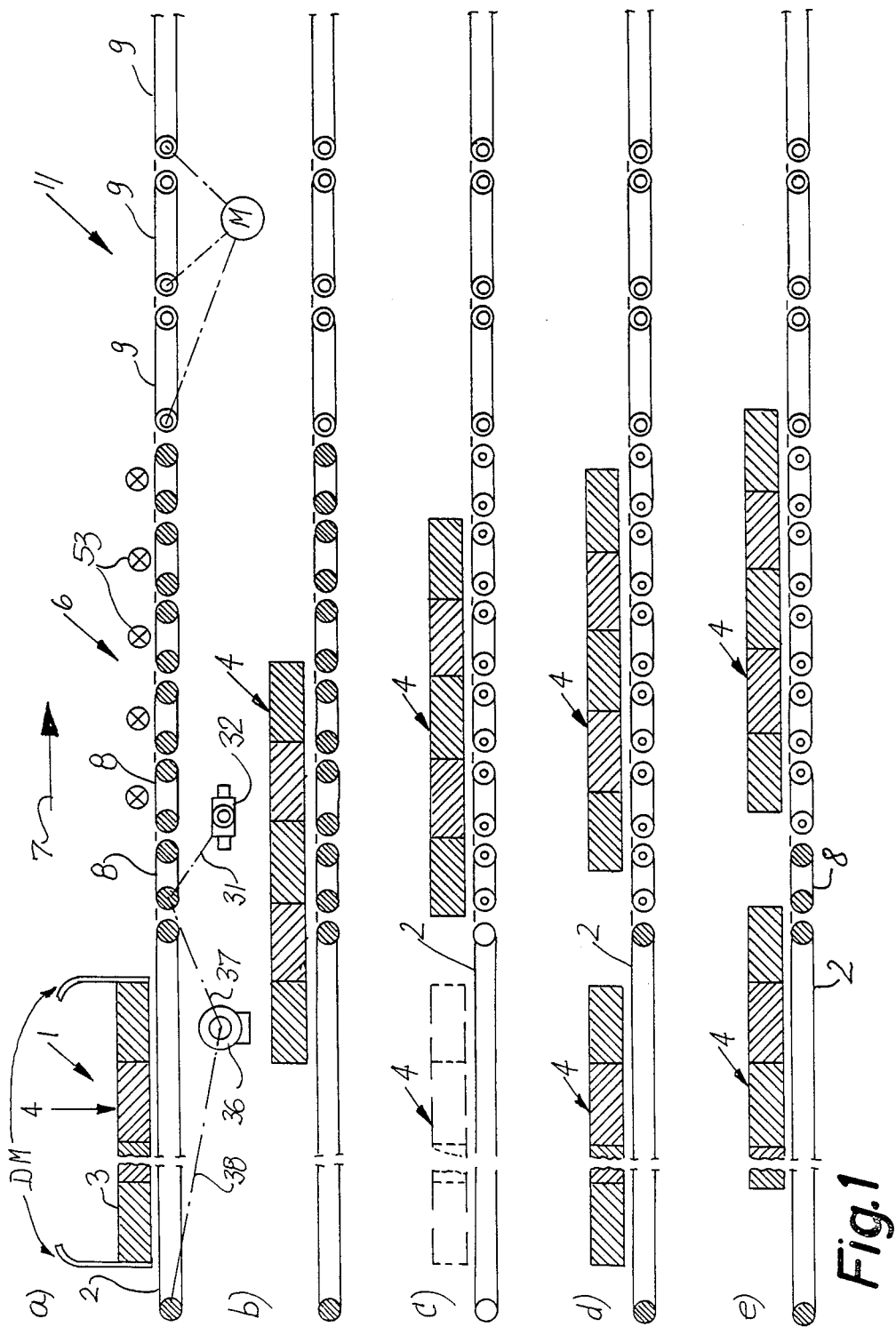
FIG. 1 (composed of FIGS. 1a, 1b, 1c, 1d and 1e) illustrates schematically five steps in the conversion of two successive groups of five stacks of paper sheets each into a single row of spaced-apart equidistant stacks.
Figure 2:
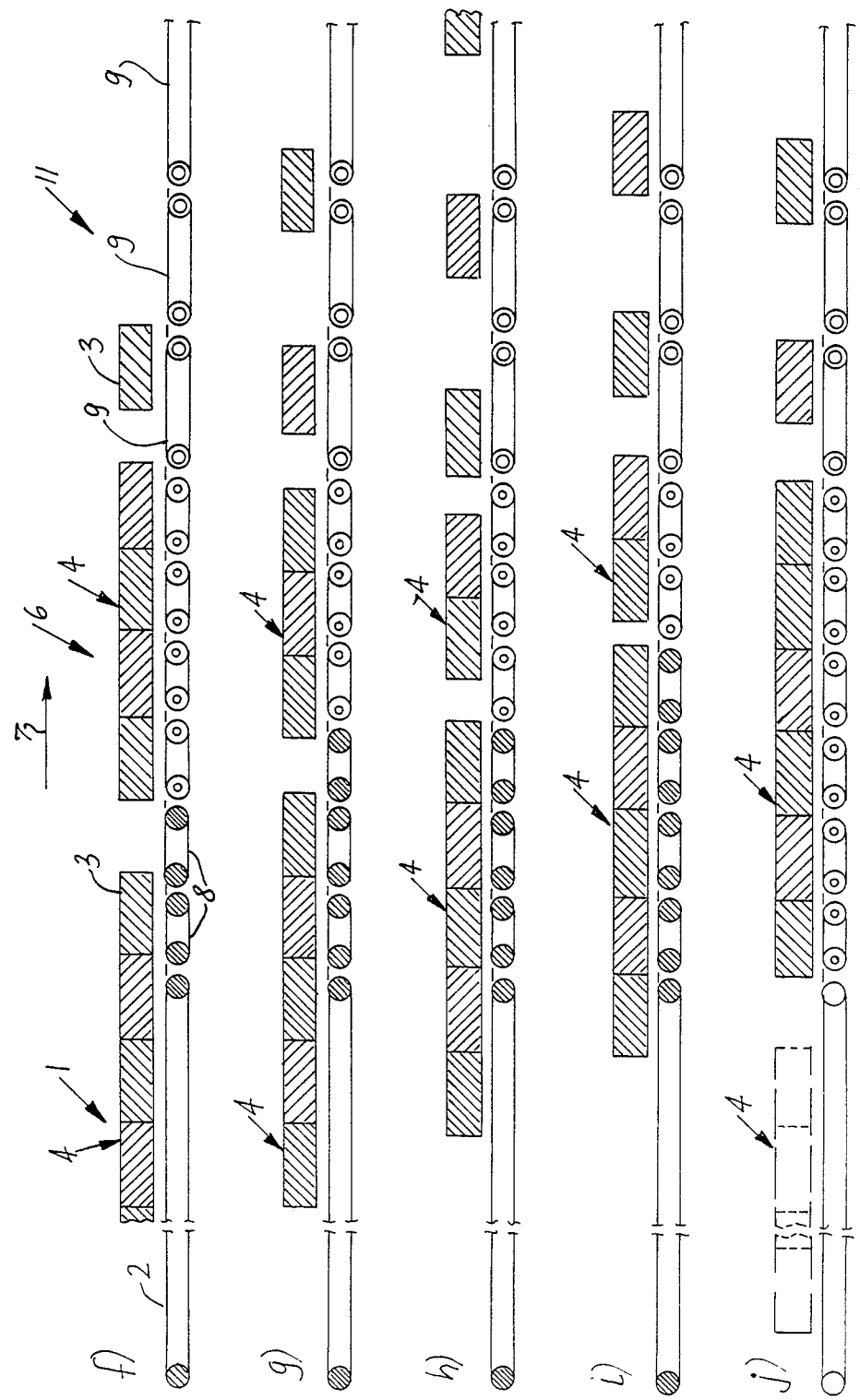
FIG. 2 (composed of FIGS. 2f, 2g, 2h, 2i and 2j) illustrates schematically five additional stages in the aforementioned conversion of two successive groups of stacks into a single row of spaced-apart equidistant stacks which are ready to be delivered to a packing or other processing or consuming machine.

Referring first to FIGS. 1 and 2, the improved transporting apparatus comprises a first transporting unit or system 1 which is composed of one or more belt conveyors 2 and serves to receive successive groups 4 of neighboring stacks 3 of superimposed paper sheets. Each group 4 preferably contains a predetermined number of stacks which are immediately adjacent to and normally contact each other. In other words, the length of each of a series of successive groups 4 is preferably the same. A suitable tongs or an analogous delivering device DM supplies successive groups 4 in a direction at right angles to the plane of FIG. 1. The apparatus further comprises a second transporting unit or system 6 which includes a series of gathering or accumulating conveyors 6. The conveyors 6 are disposed one behind the other, as considered in the direction of arrow 7, namely, in the direction of transport of successive discrete stacks 3 from the transporting unit 1 onto the transporting unit 6 and from the transporting unit 6 onto a third transporting unit or system 11 which includes a series of several successive singularizing conveyors 9, again as viewed in the direction of arrow 7.

The details of the second transporting unit or system 6 which includes the gathering or accumulating conveyors 8 are shown in FIGS. 3, 4, 5 and 6. As can be best seen in FIG. 4, each gathering conveyor 8 comprises several discrete endless belts 5 which are disposed in parallel vertical planes. Furthermore, the neighboring gathering conveyors 8 are interdigitated, i.e., the leading ends of the belts 5 which form part of a next-following gathering conveyor 8 are in register with the trailing ends of belts 5 which form part of the preceding gathering conveyor 8. This can be readily seen in FIGS. 3 and 4 which show that the pulleys 12 for the leading ends of the upper reaches of endless belts 5 forming part of a next-following gathering conveyor 8 are coaxial with the pulleys 12 for the trailing ends of upper reaches of endless belts 5 forming part of the preceding gathering conveyor 8. The upper reaches of all belts 5 are disposed in a common horizontal plane which is further common to the upper reach or reaches of the belt conveyor or conveyors 2 forming part of the first transporting unit 1 and to the upper reaches of singularizing conveyors 9 forming part of the third transporting unit 11.

The pulleys 12 for the belts 5 of the gathering conveyors 8 are rotatable on fixedly mounted shafts 13 whose end portions are secured to two upright side walls 14, 16 forming part of the frame or housing of the improved apparatus. The belts 5 of each gathering conveyor 8 are further trained over pulleys 17a on horizontal drive shafts 17 which are rotatably journalled in the side walls 14, 16. As can be seen in FIG. 3, the drive shafts 17 are disposed at a level well below the common horizontal plane of the upper reaches of the belts 5 and serve to drive the respective belts 5 in directions indicated by arrows 5a, i.e., so that the upper reaches of the belts 5 advance in a direction to the right, as viewed in FIGS. 1, 2, 3 and 4.

Figure 4:
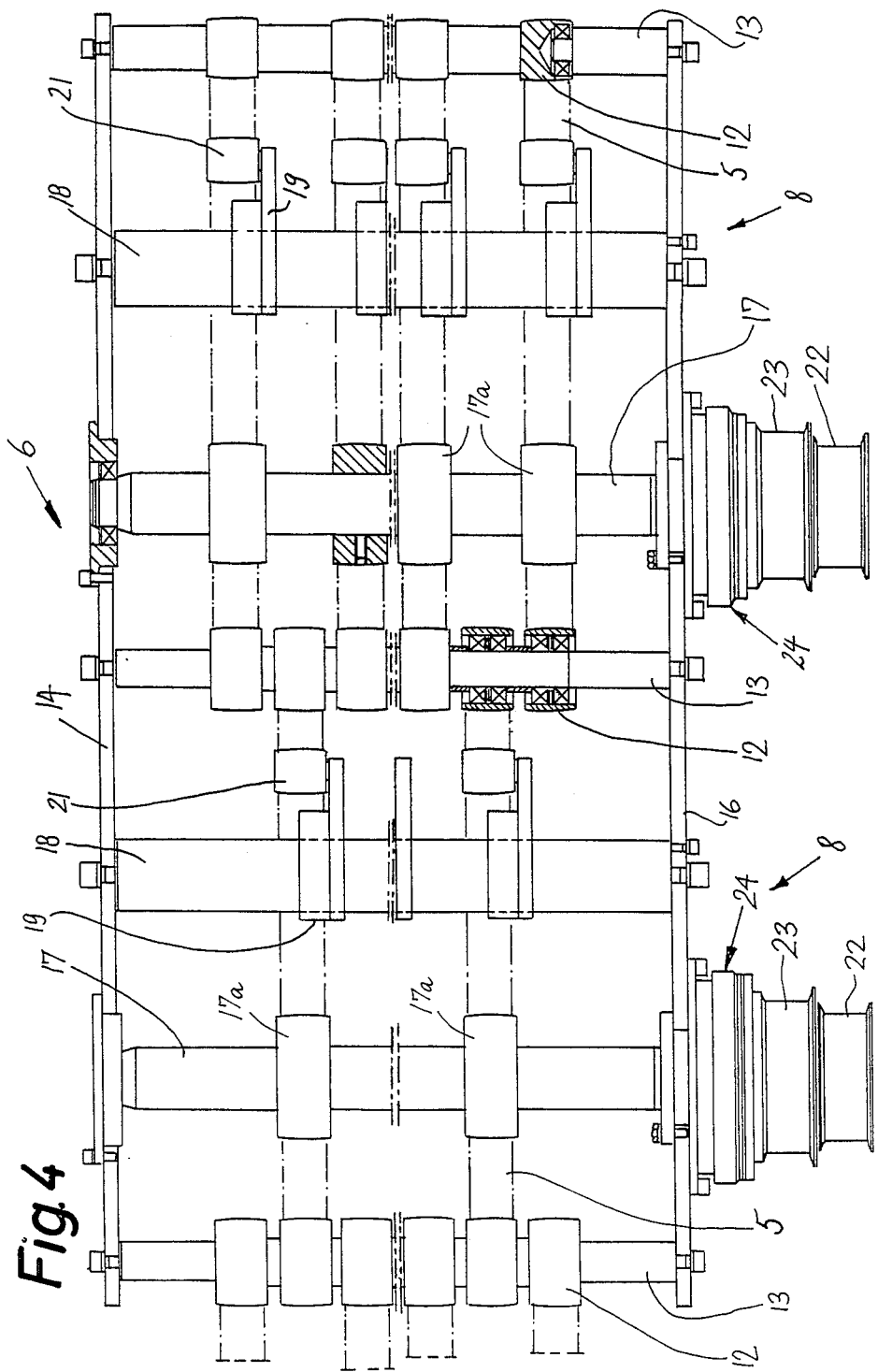
FIG. 4 is an enlarged plan view of a portion of the second transporting unit, with certain parts shown in a horizontal sectional view.

The belts 5 of each gathering conveyor 8 are further trained over pulleys 21 forming part of tensioning devices 19 which are angularly adjustably mounted on fixed shafts 18 extending between and supported by the side walls 14 and 16. FIG. 4 shows that the apparatus can comprise a discrete tensioning device 19, with its own tensioning pulley 21, for each and every belt 5.

The means for transmitting torque to the shafts 17 is disposed at the outer side of the side wall 16, i.e., at a level below such side wall, as viewed in FIG. 4 or 5. To this end, each drive shaft 17 comprises a stub 17b which extends outwardly beyond the side wall 16 and carries a first driver roller or wheel 22 as well as a second driver roller or wheel 23. The rollers 22 can transmit torque to the respective shafts 17 by way of overrunning clutches or freewheels 17c (see FIG. 5), e.g., freewheels of the type manufactured and sold by the firm Stieber, Oberschleissheim, Federal Republic Germany, under the designation NSS 50. Each driver wheel 23 can be coupled to the stub 17b of the respective shaft 17 by an electromagnetic clutch 24, e.g., by an electromagnetic clutch of the type known as 14.105.12.13 which is manufactured and sold by the firm Lenze, Hameln, Federal Republic Germany.

Certain details of one of the electromagnetic clutches 24 are shown in FIG. 5. This clutch comprises a torque-transmitting disc 26 which is fixedly secured to the corresponding driver roller or wheel 23 by screws or analogous fasteners, a clutch disc 28 which is non-rotatably secured to the respective shaft 17 and can receive torque from the disc 26 by way of a friction ring 27 disposed between the discs 26 and 28, as well as a ring 29 which is fixedly secured to the side wall 16 by screws or analogous fasteners and carries one or more coils 29a which can be energized to urge the disc 28 axially against the friction ring 27 which, in turn, bears against the disc 26 so that the driver wheel 23 can transmit torque to the shaft 17 when the coil 29a is energized.

The means for driving the wheels 22 on all of the shafts 17 comprises a first motor 32 which derives motion from the main prime mover MPM (FIG. 7) of the machine embodying the improved apparatus and transmits torque to the wheels 22 by way of a single endless toothed belt 34 (see FIG. 6). The motor 32 drives the wheels 22 at a constant speed. In FIG. 1a, the endless toothed belt 34 is indicated schematically by a phantom line 31. The belt 34 is trained over guide rolls 33 shown in FIG. 6. The motor 32 may constitute a transmission whose input element receives torque from the main prime mover MPM of the machine, e.g., from a variable-speed electric motor which drives the mobile components of a machine for conversion of sheets into stacks and for introduction of discrete stacks into individual cartons or other types of containers.

The means for driving the wheels 23 on all of the shafts 17 comprises a variable-speed motor 36 which is shown in FIGS. 1a and 6 and which preferably further serves to drive the conveyor or conveyors 2 of the first transporting unit 1. The arrangement is such that the motor 36 can drive the wheels 23 intermittently but at a speed which is higher than that of the wheels 22 (these wheels are driven at a constant speed by the aforementioned first motor 32). The means for transmitting torque from the output element of the motor 36 to the wheels 23 on all of the shafts 17 includes an endless toothed belt 39 (see FIG. 6) which is trained over one or more guide rolls 33a and some of the guide rolls 33. In FIG. 1a, the toothed belt 39 is denoted by phantom lines 37 and 38 which indicate that the motor 36 can drive the shafts 17 as well as the belt conveyor or conveyors 2 of the first transporting unit 1. The output element of the motor 36 can drive the belt 39 through the medium of an overrunning clutch (not shown), or such a clutch can be disposed between the belt 39 and the shaft or shafts which drive the conveyor or conveyors 2 of the first transporting unit 1. The motor 36 can accelerate the conveyor means 2 and the driver wheels 23 from zero speed to the aforementioned relatively high speed which exceeds the speed of the driver wheels 22.

Figure 7:
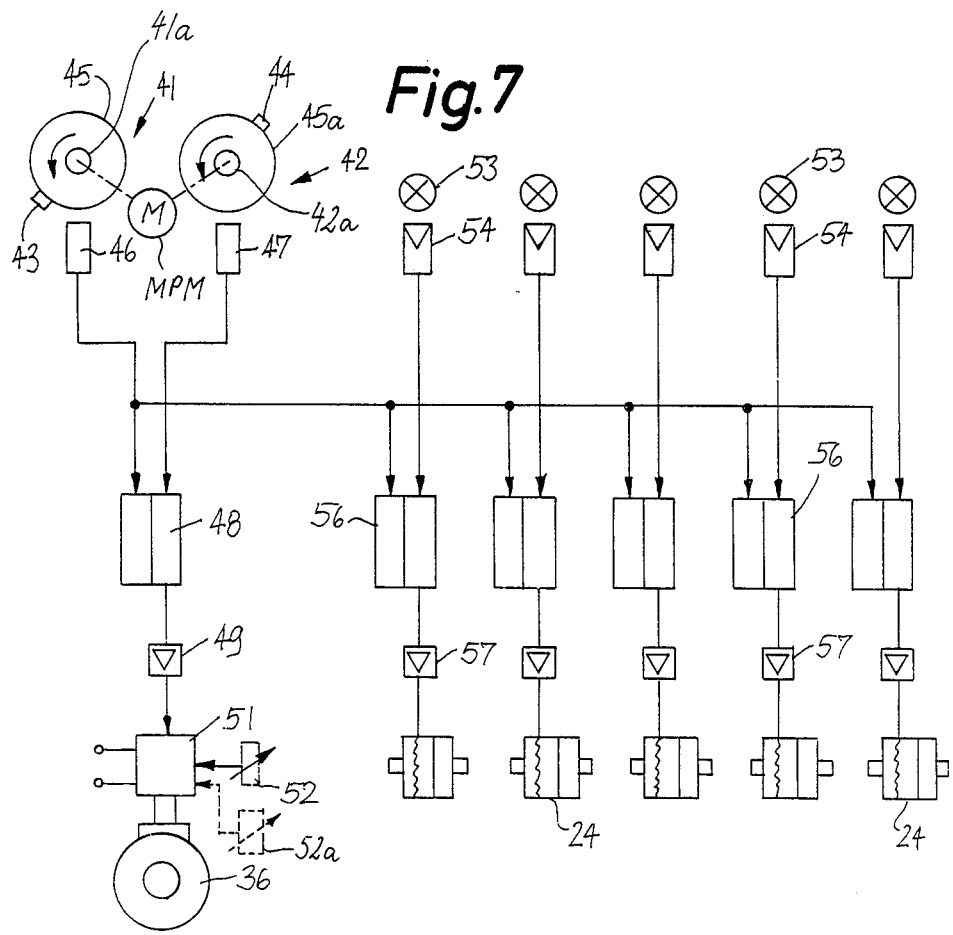
FIG. 7 is a circuit diagram showing the means for regulating the speed of gathering conveyors in the second transporting unit and the speed of conveyor means in the first transporting unit.

The means for regulating the operation of the drive means for the shafts 17 of the transporting unit or system 6 is shown in FIG. 7. Such regulating means includes two timing pulse generators 41 and 42 whose shafts 41a, 42a are driven by the aforementioned main prime mover MPM of the machine embodying the improved transporting apparatus. The shafts 41a and 42a respectively carry discs 45, 45a for orbiting permanent magnets 43, 44 or analogous actuating elements for discrete proximity detector switches 46 and 47. The outputs of the proximity detector switches 46, 47 are connected to the corresponding inputs of a first memory 48 which can constitute a so-called flip flop circuit and whose output is connected with one input of a control unit 51 by way of an amplifier 49. The control unit 51 can utilize cards of the type known as ETU and PCU furnished by the firm Contraves, Regensdorf, Switzerland. A second input of the control unit 51 is connected with an adjustable potentiometer 52 or another suitable adjustable source of reference signals. The output of the control unit 51 is connected with the motor 36.

The second, third, fourth, fifth and sixth gathering conveyors 8 of the second transporting unit 6 (as viewed in the direction of arrow 7 shown in FIG. 1a) are adjacent to discrete monitoring devices in the form of photocells each of which includes a light source 53 and a photoelectronic transducer 54. The output of the proximity detector switch 46 is connected with the first inputs of five memories in the form of flip flop circuits 56, one for each of the second, third, fourth, fifth and sixth gathering conveyors 8 of the transporting unit 6. The second inputs of the memories 56 are connected with the outputs of the respective transducers 54, and the outputs of the memories 56 are connected with the coils 29a of the respective electromagnetic clutches 24 by way of discrete amplifiers 57.

Figure 8:
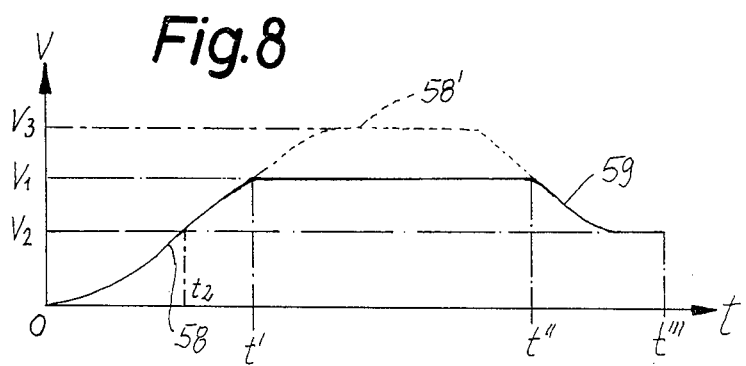
FIG. 8 is a diagram wherein the curves denote the speeds of gathering conveyors in the second transporting unit during various stages of conversion of successive groups of stacks into a single file of abutting stacks.

The operation of the transporting apparatus is as follows:

FIG. 1a shows that the first transporting unit 1 supports a group 4 of say five neighboring stacks 3. Such group has been furnished by the tongs DM or another suitable delivering device in a direction at right angles to the plane of FIG. 1, e.g., from the sheet collecting or stack forming unit of a multitrack stack forming and processing machine which embodies the tongs DM. At the time of delivery of a group 4 onto the transporting unit 1, the belt conveyor or conveyors 2 of this transfer unit are idle. When the tongs DM has released the freshly delivered group 4 of five neighboring stacks 3, the orbiting actuating element 44 on the disc 45a of the second timing pulse generator 42 shown in FIG. 7 moves nearest to and causes the respective proximity detector switch 47 to transmit a signal to the right-hand input of the associated flip flop circuit 48. The shaft 42a of the timing pulse generator 42 is driven by the main prime mover MPM (either directly or indirectly) in synchronism with operation of the aforementioned tongs DM. The signal which is transmitted by the proximity detector switch 47 sets the flip flop circuit 48 so that the output of this circuit transmits a signal which is amplified at 49 and is applied to the corresponding input of the control unit 51. The control unit 51 is activated with the result that the motor 36 is started to drive the toothed belt 39 and hence the wheels 23 on the shafts 17 of the gathering conveyors 8. The control unit 51 is programmed in such a way that it effects a predetermined reproducible acceleration of the motor 36 in a manner as indicated by the curve 58 in the velocity-time diagram of FIG. 8. In other words, the motor 36 is accelerated gradually for an interval of time between the instant zero and the instant t′ whereby the speed of the wheels 23 gradually rises to and gradually exceeds the constant speed $v_2$ of the wheels 22 which are driven by the motor 32. The maximum speed $v_1$ of the motor 36 is selected by the setting of the source 52 of reference signals, i.e., by adjustment of the potentiometer which, in the embodiment of FIGS. 1 to 7, constitutes the source 52.

Since the motor 36 is operatively connected (at 38 in FIG. 1a) with the first transporting unit 1, the conveyor or conveyors 2 of the transporting unit 1 are accelerated from zero speed to the speed $v_1$ within the interval of time between the instants 0 and t′, and the freshly delivered group 4 resting on the upper reach or reaches of the conveyor or conveyors 2 is advanced in the direction of arrow 7, as viewed in FIG. 1a, namely, along a first portion of the path for the stacks 3 and toward the second transporting unit 6. It is assumed here that the just discussed group 4 is the first or foremost group of a series of successive groups, i.e., that the apparatus has been started and the tongs DM has delivered the first group 4 of five stacks 3 from a stack forming and collecting station to the station accommodating the transporting unit 1. Therefore, the monitoring devices (including the light sources 53 and the corresponding transducers 54) which are associated with the second, third, fourth, fifth and sixth gathering conveyors 8 of the transporting unit 6 do not "see" any stacks 3 when the conveyon or conveyors 2 of the transporting unit 1 are set in motion by the motor 36. Consequently, the transducers 54 are exposed to light beams issuing from the corresponding light sources 53, and they transmit signals to the right-hand inputs of the five flip flop circuits 56 shown in FIG. 7. The flip flop circuits 56 transmit signals which are amplified at 57 and energize the coils 29a of the respective electromagnetic clutches 24. In other words, the shafts 17 of five of the six conveyors 8 are coupled to the respective driver wheels 23 which are rotated by the motor 36. Thus, when the motor 36 is started by the control unit 51 in the aforedescribed manner, the motor 36 accelerates the wheels 23 at the same rate (see the curve 58 in the diagram of FIG. 8) as the conveyor or conveyors 2 of the first transporting unit 1. At the instant 0, the shafts 17 are driven at the constant speed $v_2$ by the first motor 32 via wheels 22 and overrunning clutches 17c, and the speed of the shafts 17 remains unchanged (i.e., it equals $v_2$) during the interval between the instants 0 and $t''$ (see FIG. 8). At such time, the speed of five shafts 17 begins to increase and reaches the speed $v_1$ after elapse of the interval between $t''$ and $t'$. During acceleration of the shafts 17 to the speed $v_1$ and while the five shafts 17 thereupon rotate at the speed $v_1$, the wheels 22 continue to rotate at the lower speed $v_2$ without interfering with acceleration of the five shafts 17 because the overrunning clutches 17c enable such shafts 17 to rotate relative to the associated wheels 22. The aforementioned overrunning clutch in the motor 36 allows gradual acceleration of the conveyor or conveyors 2 of the first transporting unit 1 during that interval of acceleration of the conveyor means 2 when the speed of such conveyor means is less than the constant speed $v_2$. The speed of the wheels 23 begins to exceed the constant speed $v_2$ of the wheels 22 after elapse of the interval between 0 and $t''$, and the wheels 22 thereupon continue to rotate at the speed $v_2$ without, however, transmitting torque to the aforementioned five shafts 17.

As a result of the just discussed acceleration of the conveyor means 2 and of five gathering conveyors 8 to the speed $v_1$ (namely, as a result of acceleration of conveyor means 2 from zero speed to the speed $v_1$ while the five conveyors 8 are accelerated from the speed $v_2$ to the speed $v_1$), the stacks 3 of the foremost or first group 4 are transferred in the direction of arrow 7 and move from the positions shown in FIG. 1a to the positions which are illustrated in FIG. 1b. All of the stacks 3 in the foremost group 4 are transported at the same speed because acceleration of the first five conveyors 8 from the speed $v_2$ to the speed $v_1$ can be completed during the interval of acceleration of the conveyor means 2 from zero speed to the speed $v_1$ (while the foremost group 4 is still supported by the first transporting unit 1).

FIG. 1c shows that stage of transport of the foremost group 4 when all of its five stacks 3 are supported by gathering conveyors 8 of the second transporting unit 2. At such time, the main prime mover MPM of the machine causes the shaft 41a of the first timing pulse generator 41 to assume an angular position in which the actuating element 43 on the disc 45 initiates the transmission of a signal from the proximity detector switch 46 to the left-hand inputs of the flip flop circuits 48 and 56. The signal at the output of the flip flop circuit 48 disappears, and the motor 36 is arrested at the instant $t''$ so that the wheels 23 are disconnected from the output element of the motor 36 and the speed of the aforementioned five shafts 17 is reduced from $v_1$ to $v_2$ during the interval between the instants $t''$ and $t'''$ (note FIG. 8). The curve 59 indicates that the deceleration of five shafts 17 between the instants $t''$ and $t'''$ is gradual. The conveyor means 2 of the first transporting unit 1 is arrested in response to stoppage of the motor 36, i.e., in response to transmission of a signal from the proximity detector switch 46 to the left-hand input of the flip flop circuit 48 shown in FIG. 7. For the sake of more convenient visualization of operation of various transporting units, the pulleys for the driven conveyors are provided in FIG. 1 with 45-degree hatching. Thus, it will be seen that, in FIG. 1c, the conveyor means 2 of the first transporting unit 1 is arrested as a result of completed transfer of the foremost group 4 onto the conveyors 8 of the second transporting unit 6 and ensuing stoppage of the motor 36.

As shown in FIG. 7, the signal which is transmitted by the proximity detector switch 46 is further applied to the left-hand inputs of all five flip flop circuits 56 with the result that the clutches 24 are deenergized and the wheels 23 are disconnected from the respective shafts 17. Such deenergization takes place at the instant $t'''$, i.e., simultaneously with stoppage of the conveyor means 2 forming part of the first transporting unit 1. Consequently, the shafts 17 are then driven by the motor 32 at the relatively low but constant speed $v_2$. In FIG. 2, hatching of the pulleys for the conveyors 8 denotes that such conveyors are driven at the higher speed $v_1$; the absence of hatching indicates that the conveyors 8 are driven at the constant lower speed $v_2$.

The tongs DM thereupon delivers a second group 4 of five neighboring stacks 3 onto the conveyor means 2 of the first transporting unit 1 which is then idle. This is indicated in FIG. 1c by broken lines. In the next step, the main prime mover MPM again moves the shaft 42a of the second timing pulse generator 42 to an angular position in which the proximity detector switch 47 is caused to transmit a signal to the right-hand input of the flip flop circuit 48, i.e., the control unit 51 receives a signal and effects a renewed acceleration of the motor 36 from zero speed to the speed $v_1$ with the result that the conveyor means 2 is accelerated from zero speed to the speed $v_1$ and five shafts 17 are accelerated from the constant lower speed $v_2$ to the speed $v_1$, i.e., to the speed of the fully accelerated conveyor means 2. During acceleration of the conveyor means 2, the initially large clearance or gap between the foremost group 4 (on the gathering conveyors 8 of the second transporting unit 6) and the next-following group 4 (on the conveyor means 2 of the first transporting unit 1) is gradually reduced because (note FIG. 1d) the speed of the conveyor means 2 increases while the conveyors 8 continue (for a while) to move at the speed $v_2$. The width of the just mentioned clearance or gap between the foremost and next-following groups 4 is reduced to zero before all of the stacks 3 which form the foremost group 4 leave the second transporting unit 6. In other words, the two groups 4 are converted into a single but longer composite group whose length (as considered in the direction of arrow 7) exceeds the length of a single group 4 at least by the length of one stack 3 before the last stack of the preceding group 4 is transferred onto the third transporting unit 11.

The manner in which the aforementioned clearance or gap between the preceding and next-following groups 4 of five stacks 3 each is reduced to zero before the last stack 3 of the preceding group 4 leaves the second transporting unit 6 is illustrated in FIGS. 1d, 1e of FIG. 1 and in FIGS. 2f to 2j of FIG. 2. The reduction of clearance or gap between the preceding and next-following groups 4 is due to the fact that the speed of the conveyor means 2 rises above $v_2$ while the foremost gathering conveyors 8 of the second transporting unit 6 are still driven at the constant speed $v_2$, i.e., the next-following group 4 on the conveyor means 2 catches up with the last stack 3 of the preceding group 4 on the transporting unit 6. This will be understood by referring to FIGS. 1e and 2f to 2i, and by simultaneously considering FIG. 7. Thus, successive monitoring devices transmit signals in response to advancement of the trailing end of the last stack 3 of the preceding group 4 beyond the respective light sources 53. In other words, the leftmost transducer 54 of FIG. 7 transmits a signal when the trailing end of the preceding or foremost group 4 advances to the right and beyond the associated light source 53 so that such transducer can receive a beam of light and transmits a signal to the right-hand input of the corresponding flip flop circuit 56. The leftmost clutch 24 of FIG. 7 then couples the shaft 17 for the first or leftmost gathering conveyor 8 with the motor 36 so that the leftmost conveyor 8 is accelerated to the higher speed $v_1$ ahead of the remaining five conveyors 8 which continue to be driven at the constant lower speed $v_2$. This is shown in FIG. 1e wherein the hatching indicates that the leftmost conveyor 8 is driven at the speed $v_1$ while the remaining five conveyors 8 are still driven at the lower speed $v_2$.

The trailing end of the last stack 3 forming part of the preceding or foremost group 4 then advances past and beyond the second light source 53 (i.e., beyond the second leftmost light source 53, as viewed in FIG. 7) so that the associated transducer 54 is exposed to light and energizes the corresponding clutch 24 which connects the motor 36 with the shaft 17 for the second leftmost gathering conveyor 8 (note FIG. 2f) so that the second leftmost conveyor 8 is rapidly accelerated to the speed $v_1$ while the remaining four conveyors 8 continue to be driven at the lower speed $v_2$. The same procedure is resorted to in order to accelerate the third leftmost, the fourth leftmost and the fifth leftmost (second rightmost) conveyors 8 from the speed $v_2$ to the speed $v_1$ with the result that the leading stack 3 of the next-following group 4 is moved nearer and nearer to the last or rearmost stack of the preceding group 4 until the gap or clearance between the two groups 4 is reduced to zero, still on the second transporting unit 6. It will be noted that the first five gathering conveyors 8 are accelerated from the lower speed $v_2$ to the higher speed $v_1$ as soon as the last stack 3 of the preceding group 4 advances therebeyond (as considered in the direction of arrow 7). This has been found to constitute a very simple but highly efficient and reliable way of closing the gap or clearance between the preceding and next-following groups 4 on the second transporting unit 6, i.e., prior to completion of singularization of the preceding group 4. FIG. 2j shows that the gap between the two groups 4 is closed, i.e., the composite group on the conveyors 8 of the second transporting unit 6 is a file consisting of six immediately adjacent stacks 3.

The closing of the gap or clearance between a preceding and the next-following group 4 on the transporting unit 6 can be ensured by appropriate adjustment of the potentiometer 52 which constitutes a source of reference signals for the control unit 51 and determines the absolute value of the speed $v_1$. Thus, if the gap is relatively wide, the potentiometer 52 is set in such a way that the speed $v_1$ is raised, i.e., that the difference between the speeds $v_2$ and $v_1$ is increased. This means that the difference between the speeds $v_1$ and $v_2$ must suffice to ensure that the gap or clearance between the preceding and next following groups 4 is closed not later than at the instant $t'''$, i.e., that the gap is closed during the interval of deceleration of shafts 17 from the speed $v_1$ to the speed $v_2$ between the instants $t''$ and $t'''$.

When the gap is closed, the timing pulse generator 41 again causes the proximity detector switch 46 to transmit a signal which arrests the motor 36 via flip flop circuit 48, amplifier 49 and control unit 51 in a manner as described above. At the same time, the signals at the outputs of the five flip flop circuits 56 also disappear so that all of the gathering conveyors 8 are then driven at the constant lower speed $v_2$, namely, by the motor 32 through the medium of the driver wheels 22. In other words, the shafts 17 are driven at all times, either at the speed $v_2$ or (five of the shafts 17) at the speed $v_1$, depending on the condition of the second motor 36.

During closing of the gap between the preceding and next-following groups 4 on the transporting units 1 and 6, the transporting unit 6 continuously delivers successive stacks 3 of the preceding and thereupon of the composite group into the range of the leftmost singularizing conveyor 9 forming part of the third transporting unit 11. Since the rightmost conveyor 8 is always driven at the speed $v_2$, since the speed of the leftmost singularizing conveyor 9 is constant, and since the ratio of speeds of successive singularizing conveyors 9 is also constant, successive groups 4 of five stacks 3 each are converted into a continuous row of discrete stacks 3 wherein the spacing between neighboring stacks 3 is always the same. As mentioned above, the speed of the rightmost singularizing conveyor 9 is higher than the speed of the next-following singularizing conveyor 9 (as viewed in the direction of arrow 7) and so forth. The ratio of speeds of the singularizing conveyors 9 and/or the ratio of the speed of the leftmost singularizing conveyor 9 to the speed $v_2$ can be changed if the operators wish to increase the width of spaces between successive discrete stacks 3 which leave the third transporting unit 11 to be delivered to a carton filling machine, to storage or to another destination. The reference character 9a (FIG. 1a) denotes a means for driving the singularizing conveyors 9 at different speeds.

As mentioned above, the length of successive groups 4 which are delivered onto the transporting unit 1 is preferably the same. This ensures that the apparatus need not compensate for differences between the spacing of stacks 3 in successive groups 4 but must eliminate only the gaps or clearances between successive groups 4. The aforementioned gaps are closed by appropriate (aforedescribed) regulation of the speed of the conveyor means 2 as well as by successive acceleration of certain gathering conveyors 8 so that the width of the gap between a preceding and a next-following group 4 is reduced to zero before the last stack 3 of the preceding group leaves the second transporting unit 6. The last conveyor 8 (i.e., that gathering conveyor which is nearest to the third transporting unit 11) can advance at a constant speed during each and every stage of operation of the improved apparatus. This is the reason that the diagram of FIG. 7 shows only five clutches 24 and only five monitoring devices. The monitoring devices ensure an optimum regulation of the speeds of the first five gathering conveyors 8 in order to ensure predictable and reliable elimination of gaps or clearances between successive groups 4 before the last stack of a preceding group leaves the transporting unit 6. The improved apparatus can embody a second transporting unit wherein the number of gathering conveyors 8 is greater or less than six. It is important to select the length of the transporting units 1 and 6 (as considered in the direction of arrow 7) in such a way that each preceding group 4 is decelerated (or more accurately stated, driven at the lower speed $v_2$) for a relatively long interval of time, as well as that the next-following group 4 is accelerated for a relatively long interval of time because this ensures rapid closing of the gaps between such groups. This is achieved by the aforediscussed positioning of monitoring devices with reference to the gathering conveyors 8, i.e., in such a way that a conveyor 8 is accelerated as soon as the last stack 3 of a preceding group 4 has been advanced beyond such conveyor so that the accelerated gathering conveyor is then ready to transport the stacks 3 of the oncoming next-following group 4 at the higher speed $v_1$.

The aforediscussed motors 32, 36 and their connections with the shafts 17 of the gathering conveyors 8 contribute to the simplicity and compactness of the transporting unit 6 as well as to the ability of this transporting unit to rapidly react to arrival of successive groups 4 from the first transporting unit 1. This is attributable to the fact that the motor 32 can drive the shafts 17 by way of the respective overrunning clutches 17c so that all of the shafts 17 can be driven at the lower speed $v_2$ whenever the motor 36 is idle, i.e., whenever the speed of the wheels 23 does not exceed the speed of the wheels 22. The operative connections between the second motor 36 and the shafts 17 (via electromagnetic clutches 24) are also simple and reliable. The feature that the motor 32 is driven by the main prime mover MPM of the machine also contributes to simplicity and compactness of the improved apparatus. The same holds true for the feature that the means (motor 36) which can intermittently drive the conveyor means 2 of the first transporting unit at several speeds is the same means which can accelerate five of the shafts 17 from the constant lower speed $v_2$ to the higher speed $v_1$ when such acceleration is necessary in order to ensure the elimination of gaps between successive groups 4.

The improved apparatus exhibits the additional advantage that its third transporting unit 11 comprises several successive singularizing or accelerating conveyors 9. This renders it possible to gradually increase the width of spaces between successive stacks 3 on the transporting unit 11 to a desired maximum width, to ensure the establishment of spaces of predetermined width irrespective of the speed at which the transporting unit 11 receives successive stacks 3, as well as to prevent excessive or abrupt acceleration of stacks 3 from the speed of the last or rightmost gathering conveyor 8 (namely from the speed $v_2$) to the speed of the rightmost singularizing conveyor 9. In other words, acceleration of successive stacks 3 of the composite group of stacks on the transporting unit 6 takes place in several stages to thus prevent shifting of sheets in the stacks which are being transferred to and which advance with the conveyors 9. This is particularly important in modern high-speed machines wherein the singularized stacks 3 must be delivered to a packing machine or to another destination at frequent intervals and at a very high speed.

The conveyors 9 are driven continuously but at different speeds, i.e., the speed of the rightmost conveyor 9 is higher than the speed of the next-following conveyor, and so forth. As mentioned above, this allows for stepwise (rather than abrupt) increase of the width of spaces between successive singularized stacks 3 to the prescribed or required maximum or ultimate width.

Figure 9:
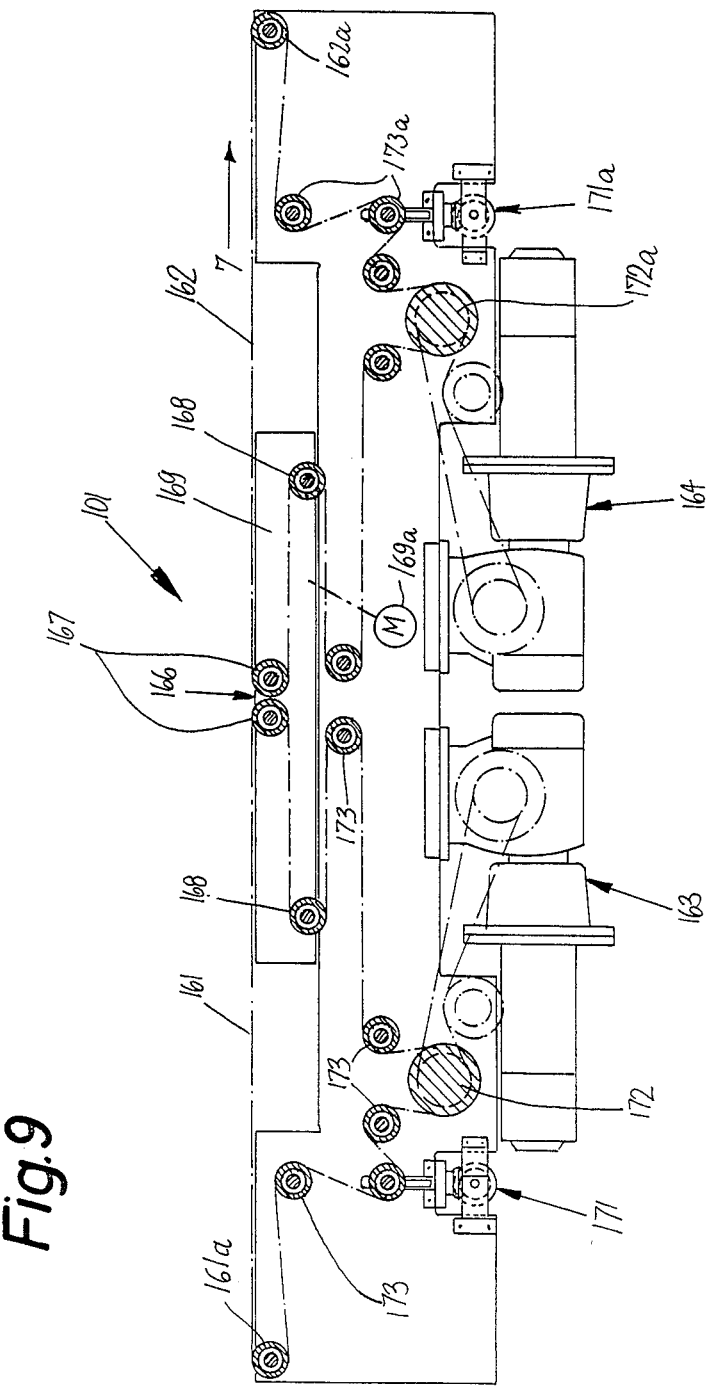
FIG. 9 is a partly elevational and partly longitudinal vertical sectional view of a modified first transporting unit.
Figure 10:
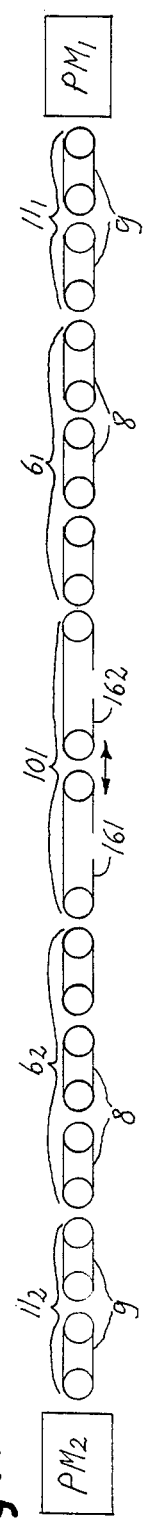
FIG. 10 is a schematic side elevational view of an apparatus with two processing or consuming machines which embodies the first transporting unit of FIG. 9.

FIG. 9 shows a portion of a modified apparatus, and more particularly a modified first transporting unit or system 101 which can be used in lieu of the transporting unit 1 of the apparatus of FIGS. 1 to 8. The transporting unit 101 of FIG. 9 comprises two endless belt conveyors 161 and 162 which can be driven, in the same direction or in opposite directions, by discrete reversible motors 163 and 164. Those end portions of the upper reaches of the conveyors 161 and 162 which are adjacent to each other define a clearance 166. The corresponding end portions of the upper reaches of the conveyors 161 and 162 are trained over pulleys 167 which are mounted on a carriage 169 reciprocable in and counter to the direction of arrow 7, namely, toward and away from the adjacent (last or rearmost) conveyor 8 (see FIG. 10) of the respective second transporting unit $6_1$. Such conveyor 8 is adjacent to the right-hand end turn of the upper reach of the conveyor 162 shown in FIG. 9. The pulleys 161a and 162a of FIG. 9 are rotatable about fixed axes so that the upper reach of the conveyor 161 is shortened and the upper reach of the conveyor 162 is lengthened accordingly when the carriage 169 is moved in a direction to the left, as viewed in FIG. 9, and the upper reach of the conveyor 161 is lengthened, with attendant commensurate shortening of the conveyor 162, when the carriage 169 is shifted in a direction to the right, i.e., toward the second transporting unit $6_1$. The conveyors 161, 162 are held under requisite tension by discrete tensioning devices 171, 171a; they are respectively trained over guide rolls 173, 173a; and they are respectively driven by shafts 172, 172a.

The transporting unit 101 can be used in apparatus wherein two packing or other types of consuming machines simultaneously or alternately receive stacks of paper sheets from the same source. This is shown schematically in FIG. 10 wherein a first packing machine $PM_1$ is located to the right of the right-hand third transporting unit $11_1$ and a second packing machine $PM_2$ is located to the left of the left-hand third transporting unit $11_2$. The reference characters $6_1$ and $6_2$ denote two second transporting units which flank the transporting unit 101. If the packing machines $PM_1$ and $PM_2$ are to be operated simultaneously, the motor 163 drives the conveyor 161 in such a way that the upper reach of this conveyor moves in a direction to the left, i.e., toward the second transporting unit $6_2$; at the same time, the motor 164 drives the conveyor 162 to move the upper reach of this conveyor in a direction to the right, i.e., toward the second transporting unit $6_1$. If one of the packing machines $PM_1$ and $PM_2$ is idle (e.g., due to a malfunction), the reversible motors 163, 164 drive the upper reaches of the conveyors 161, 162 in the same direction so that the entire output of the machine which makes stacks of superimposed sheets is delivered to the other packing machine. At the same time, the output of the machine which supplies the stacks to the conveyors 161, 162 is reduced so as not to exceed the requirements of the other packing machine.

If the machine which supplies stacks of sheets to the conveyors 161 and 162 is designed to supply groups containing uneven numbers of stacks, e.g., if each such group contains a total of seven immediately adjacent or closely adjacent stacks, the carriage 169 is alternately moved in a direction to the left and to the right, always through a distance equalling x times w wherein w is the width of a single stack and x is an odd number, normally one. This ensures that, on the average, the packing machine $PM_1$ receives the same number of stacks as the packing machine $PM_2$ because the transporting unit $6_1$ alternately receives three, four, three, four, etc. stacks and the transporting unit $6_2$ alternately receives four, three, four, three, etc. stacks. In other words, the carriage 169 is moved back and forth in and counter to the direction which is indicated by the arrow 7 in order to alternately increase and reduce the length of the upper reaches of the conveyors 161, 162, always by a distance which equals x times w, normally w, i.e., the width of a single stack of superimposed sheets.

The means for moving the carriage 169 back and forth through distances equalling x times w may include a suitable reversible electric motor 169a which is actuated by one of the timing pulse generators 41, 42 shown in FIG. 7 or by any other suitable means capable of ensuring timely reversal of the direction of movement of the carriage to thus ensure (in the long run) an equal distribution of arriving stacks between the packing machines $PM_1$ and $PM_2$.

The just described mode of alternatively supplying the transporting units $6_1$ and $6_2$ with groups containing different numbers of stacks necessarily entails corresponding changes in the width of gaps or clearances between successive groups of stacks which are moved onto and advance along the second transporting units $6_1$ and $6_2$. Therefore, the apparatus which embodies the first transporting unit 101 of FIG. 9 and which is connected with a source of stacks capable of delivering groups each containing an odd number of stacks must be provided with means for alternately changing the intensity or another characteristic of the reference signals for the control unit or units of the apparatus shown in FIG. 10. Otherwise stated, and if one assumes that the control unit 51 of FIG. 7 is used in association with the second transporting unit $6_1$ of FIG. 10, this control unit is then connected with a second source of reference signals (note the source 52a which is indicated in FIG. 7 by broken lines) in order to ensure that the conveyors 161, 162 are alternately driven at different speeds and to thus compensate for differences in the width of gaps between successive groups of stacks advancing from the conveyors 161, 162 toward and onto the respective second transporting units $6_1$ and $6_2$. Otherwise stated, the control unit for each of the two motors 163, 164 (each of which corresponds to the motor 36 shown in FIG. 7) is then combined with two sources of reference signals as well as with suitable means for alternately connecting the control unit with the first, then with the second, then with the first, and so forth source of reference signals. The manner in which the speed of the motors 163, 164 must alternately increase when the width of the gap between two neighboring groups of stacks moving in or counter to the direction of arrow 7 alternately increases is indicated by the broken-line curve 58' of FIG. 8. The speed $v_3$ is the higher of the two speeds ($v_1$ and $v_3$) at which the conveyors 161, 162 must be alternately driven under the aforediscussed circumstances, i.e., when the transporting units $6_1$ and $6_2$ of FIG. 10 alternately receive shorter and longer groups of stacks.

The improved apparatus can embody the aforedescribed transporting unit 101 of FIG. 9 because the output of the apparatus is sufficiently high (or can be raised sufficiently) to simultaneously meet the requirements of several processing or consuming machines, such as the packing machines $PM_1$ and $PM_2$. An important advantage of such apparatus is that one of the processing machines can continue to pack or otherwise treat the stacks at normal speed while the other processing machine operates at less than normal speed or is brought to a full stop. All that is necessary under such circumstances is to reduce the output of the machine or unit which turns out groups of stacks so that the output of such machine or unit will match the requirements of the one processing machine. This is achieved by the relatively simple expedient of equipping the transporting unit 101 with two conveyors (161, 162) which can be driven to advance groups of stacks thereon in the same direction or in the opposite directions. The provision of the carriage 169 and of the means for moving the carriage back and forth in and counter to the direction indicated by the arrow 7 is needed only or primarily when the machine which turns out groups of stacks delivers groups containing uneven numbers of stacks so that there exists a need to evenly distribute the supplied groups by alternately transferring larger and smaller numbers of stacks to each of the two second transporting units. As mentioned above, the stroke of the carriage 169 must equal the width w of at least one stack or an uneven multiple (x) of such width. This entails a corresponding lengthening or shortening of the conveyors 161 and 162 or analogous conveyors which form part of the modified transporting unit 101.

An important advantage of the improved apparatus is that the stacks of superimposed sheets or the like are treated gently so that the sheets or other components of the stacks are not likely to be shifted relative to each other during conversion of successive groups of neighboring stacks into one or more rows of equidistant discrete stacks. This is achieved, with reference to the apparatus of FIGS. 1 to 8, by the simple expedient that the stacks 3 of each preceding group 4 on the second transporting unit 6 are decelerated while the stacks of the next-following group on the first transporting unit 1 are accelerated to thus ensure that the foremost stack of each next-following group 4 can catch up with the rearmost stack of the corresponding preceding group while the preceding group (or at least the last or rearmost stack of the preceding group) is still supported by the second transporting unit. The acceleration of stacks 3 which constitute a next-following group and are supported by the first transporting unit 1 is gradual so that the stacks of such group are treated gently without the generation of undue stresses which would be likely to affect the integrity of the stacks. The improved apparatus avoids pronounced accelerations and decelerations of stacks or groups of stacks for the aforedescribed purposes; nevertheless, its output is sufficiently high to satisfy the requirements of one or more modern high-speed processing machines, such as the requirements of two modern packing machines for stacks of superimposed papers sheets, cardboard panels, films, foils or the like. The lowermost layers or sheets of the stacks are also protected from damage because they need not move relative to the conveyors on which the respective stacks rest, i.e., the acceleration or deceleration of stacks (and hence of the lowermost sheets of such stacks) takes place, at least during the major part of each cycle, not as a result of transfer of a stack from a faster onto a slower conveyor, and not as a result of transfer of a stack from a slower onto a faster conveyor but primarily as a result of acceleration of a conveyor while the stack is supported thereby.

A further important advantage of the improved apparatus is that the stacks on the first, second and/or third transporting unit or units are observable and readily accessible at all times, i.e., during each part of each and every cycle so that the attendants can interfere without delay when a manual adjustment is needed to avoid longer-lasting stoppage of the apparatus and/or of the entire machine in which the apparatus is put to use. However, this does not exclude the provision of suitable detectors in the form of mechanical sensors, photocells and/or others which are distributed along the path of the stacks to ensure immediate detection of undue pile-ups, gaps having excessive widths, deliveries of groups containing less than the anticipated number of stacks and/or other defects or irregularities, without necessitating continuous inspection of the operation by one or more attendants.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for manipulating groups of discrete commodities, particularly for singularizing groups of stacks of paper sheet or the like, comprising a first transporting unit arranged to receive a succession of groups consisting of at least substantially aligned neighboring commodities and to discontinuously advance such groups at a variable speed in a predetermined direction along a first portion of a predetermined path so that successive groups leaving said first unit are separated from each other by gaps, said first transporting unit comprising conveyor means for successive groups of commodities; a second transporting unit comprising a series of gathering conveyors defining a second portion of said path downstream of said first portion, as considered in said direction, first drive means for driving said conveyors at a constant first speed to thereby advance successive groups arriving from said first unit in said direction, second drive means for intermittently and individually driving at least certain of said conveyors at a higher second speed so as to eliminate the gaps between successive groups which are supplied by said first unit and to thus form a composite group of neighboring commodities, and means for regulating the operation of said second drive means, said regulating means including means for accelerating said certain gathering conveyor to said second speed one after the other, as considered in said direction, said first transporting unit further comprising means for intermittently driving said conveyor means at speeds verying between zero speed and a speed exceeding said first speed; and a third transporting unit including singularizing conveyor means defining a third portion of said path downstream of said second portion and operative to convert said composite group into a row of spaced-apart equidistant commodities, and means for driving said singularizing conveyor means at a speed exceeding said first speed.

2. The apparatus of claim 1, further comprising means for delivering to said first transporting unit groups in the form of aligned and closely adjacent commodities, the commodities of such groups being disposed one behind the other, as considered in said direction.

3. The apparatus of claim 1, wherein said regulating means comprises means for monitoring said second portion of said path.

4. The apparatus of claim 3, wherein said monitoring means comprises at least one photocell.

5. The apparatus of claim 3, wherein said monitoring means includes means for effecting acceleration of successive gathering conveyors to said second speed on movement of discrete groups of commodities beyond such gathering conveyors.

6. The apparatus of claim 1, wherein each of said gathering conveyors comprises a shaft and said first drive means comprises a motor, means for transmitting torque from said motor to said shafts, and overrunning clutches interposed between said torque transmitting means and said shafts so as to allow said shafts to rotate at a speed exceeding said first speed while said motor is in operation.

7. The apparatus of claim 6, wherein said second drive means comprises a second motor, means for transmitting torque from said second motor to the shafts of said certain gathering conveyors, and discrete clutch means interposed between said last named torque transmitting means and the shaft of each of said certain gathering conveyors, said clutch means being energizable to accelerate said last named shafts to said second speed.

8. The apparatus of claim 7, wherein said regulating means includes means for engaging said clutch means, said engaging means including means for monitoring said second portion of said path.

9. The apparatus of claim 7, wherein said first named torque transmitting means includes a driver wheel on each of said shafts, said overrunning clutches being interposed between said driver wheels and the respective shafts.

10. The apparatus of claim 7, wherein said last named torque transmitting means comprises a driver wheel on the shaft of each of said certain gathering conveyors, said clutch means being interposed between such shafts and the respective driver wheels.

11. The apparatus of claim 1, further comprising a machine for delivering groups of commodities to said first transporting unit, said machine comprising a prime mover and said first drive means comprising a device receiving motion from said prime mover.

12. The apparatus of claim 1, further comprising means for transmitting motion to said first transporting unit, said second drive means receiving motion from said motion transmitting means.

13. The apparatus of claim 1, wherein said singularizing conveyor means comprises a series of discrete conveyors disposed one after the other, as considered in said direction, and means for driving successive conveyors of said series at progressively higher speeds.

14. The apparatus of claim 13, wherein said discrete conveyors are belt conveyors.

15. The apparatus of claim 1, wherein said first transporting unit comprises two discrete conveyors and drive means for selectively moving each of said discrete conveyors in and counter to said direction.

16. The apparatus of claim 15, wherein said discrete conveyors are endless belt conveyors having substantially coplanar upper reaches defining said first portion of said path.

17. The apparatus of claim 15, further comprising means for varying the effective length of said discrete conveyors so that the effective length of one of said discrete conveyors increases simultaneously with a corresponding reduction of effective length of the other of said discrete conveyors and vice versa.

18. The apparatus of claim 17, wherein said discrete conveyors are endless belt conveyors having coplanar upper reaches and said means for varying the effective length of said discrete conveyors includes means for varying the length of said upper reaches.

19. The apparatus of claim 18, wherein said belt conveyors have pulleys adjacent to each other and the means for varying the length of said upper reaches comprises a carriage for said pulleys and means for moving said carriage back and forth in and counter to said direction.

20. The apparatus of claim 1, wherein said path is at least substantially horizontal and said gathering conveyors are interdigitated with one another.

21. The apparatus of claim 1, wherein each of said gathering conveyors consists of a plurality of discrete endless belts.

* * * * *